United States Patent
Kluge et al.

(10) Patent No.: US 12,492,206 B2
(45) Date of Patent: Dec. 9, 2025

(54) SALTS OF R-KETOROLAC

(71) Applicant: UNM Rainforest Innovations, Albuquerque, NM (US)

(72) Inventors: Arthur Kluge, Arlington, MA (US); Emily Rigsbee, West Lafayette, IN (US); Ekaterina Albert, West Lafayette, IN (US)

(73) Assignee: UNM Rainforest Innovations, New (MX)

( * ) Notice: Subject to any disclaimer, the term of this patent is extended or adjusted under 35 U.S.C. 154(b) by 717 days.

(21) Appl. No.: 17/784,179

(22) PCT Filed: Dec. 16, 2020

(86) PCT No.: PCT/US2020/065248
§ 371 (c)(1),
(2) Date: Jun. 10, 2022

(87) PCT Pub. No.: WO2021/126931
PCT Pub. Date: Jun. 24, 2021

(65) Prior Publication Data
US 2023/0035586 A1    Feb. 2, 2023

Related U.S. Application Data

(60) Provisional application No. 62/948,906, filed on Dec. 17, 2019.

(51) Int. Cl.
C07D 487/04    (2006.01)

(52) U.S. Cl.
CPC ........ *C07D 487/04* (2013.01); *C07B 2200/13* (2013.01)

(58) Field of Classification Search
CPC .......................... C07D 487/04; C07B 2200/13
See application file for complete search history.

(56) References Cited

U.S. PATENT DOCUMENTS

2003/0191187 A1    10/2003    Lee et al.

FOREIGN PATENT DOCUMENTS

| WO | WO-2008115572 A1 * | 9/2008 | .......... A61K 9/0019 |
| WO | 2021126931 | 6/2021 | |

OTHER PUBLICATIONS

"International Application Serial No. PCT US2020 065248, International Preliminary Report on Patentability mailed Jun. 30, 2022", 8 pgs.
Peretti et al., "The R-Enantiomer of Ketorolac Delays Mammary Tumor Development in Mouse Mammary Tumor Virus-Polyoma Middle T Antigen (MMTV-PyMT) Mice," Am J Pathol., 188(2), pp. 515-524 (2018).
Samal et al., "Ketorolac salt is a newly discovered DDX3 inhibitor to treat oral cancer," Scientific Reports, 5:9982, DOI:10.1038/srep09982, 10 pages (2015).
Oprea et al., "Novel Activities of Select NSAID R-Enantiomers against Rac1 and Cdc42 GTPases," PLoS ONE 10(11), e0142182, 20 pages (2015).
Zen-aldeen et al., "Physicomechanical Properties and Release Characteristics of Ketorolac Tromethamine from Chitosan Films: Effect of Inclusion of Different Polyols Plasticizers," Bull. Pharm. Sci., Assiut University, vol. 31, part 2, pp. 229-247 (2008).
International Search Report dated Jun. 30, 2021, for PCT/US2020/065248 (4 pages).
Written Opinion of the International Searching Authority dated Jun. 30, 2021, for PCT/US2020/065248 (6 pages).

* cited by examiner

*Primary Examiner* — Joseph K McKane
*Assistant Examiner* — Quincy McKoy
(74) *Attorney, Agent, or Firm* — Schwegman, Lundberg & Woessner, P.A.

(57) ABSTRACT

Salts of R-ketorolac, including solid salts, such as crystalline salts of the meglumine and tromethamine salts R-ketorolac, are disclosed. Methods of preparing such salts, pharmaceutical compositions comprising salts, and methods of treating cancer with such salts are further provided.

14 Claims, 10 Drawing Sheets

SALTS OF R-KETOROLAC

CROSS-REFERENCE TO RELATED APPLICATIONS

This application claims benefit of, and priority to, U.S. Provisional Application No. 62/948,906, filed on Dec. 17, 2019, the entire contents of which is specifically incorporated by reference herein.

BACKGROUND

Ketorolac is a prescription NSAID pain reliever, currently marketed as a racemate of the tromethamine salt. Recently, the R enantiomer of R-ketorolac has shown activity in in vitro and in vivo models of cancer, particularly ovarian cancer. The activities of the R- and S-enantiomers of ketorolac are quite different. For example, the anti-cancer effects have been associated with the R-enantiomer, which does not exhibit the analgesic properties of the S-enantiomer. Furthermore, in rat studies, R-ketorolac was much better tolerated than S-ketorolac which causes severe dose limiting toxicities. Mechanistically, R-ketorolac has been reported to target the GTPases, Cdc42 and Rac1, the dysregulation of which is associated with poor prognosis for a number of cancers.

SUMMARY

In several aspects of the invention, tromethamine salts of R-ketorolac are provided.

In additional aspects of the invention, meglumine salts of R-ketorolac are provided.

In further aspects of the invention, solid salts of R-ketorolac and tromethamine are provided.

In still further aspects of the invention, solid salts of R-ketorolac and meglumine are provided.

In additional aspects of the invention, crystalline salts of R-ketorolac and tromethamine are provided.

In yet additional aspects of the invention, crystalline salts of R-ketorolac and meglumine are provided.

In other aspects of the invention, methods of making salts of R-ketorolac and tromethamine are provided.

In still further aspects of the invention, methods of making solid salts of R-ketorolac and tromethamine are provided.

In further aspects of the invention, methods of making solid salts of R-ketorolac and meglumine are provided.

In yet additional aspects of the invention, methods of making crystalline salts of R-ketorolac and tromethamine are provided.

In still further aspects of the invention, methods of making crystalline salts of R-ketorolac and meglumine are provided.

In further aspects of the invention, pharmaceutical compositions comprising crystalline salts of R-ketorolac and tromethamine and at least one pharmaceutically acceptable excipient are provided.

In still further aspects of the invention, pharmaceutical compositions comprising crystalline salts of R-ketorolac and meglumine and at least one pharmaceutically acceptable excipient are provided.

In additional aspects of the invention, methods of treating cancer comprising administering to a patient in need thereof an effective amount of meglumine salts or tromethamine salts or both of R-ketorolac are provided.

In further aspects of the invention, uses of crystalline salts of R-ketorolac and meglumine in the treatment of cancer in a patient are provided.

In still additional aspects of the invention, uses of crystalline salts of R-ketorolac and tromethamine in the treatment of cancer in a patient are provided.

In additional aspects of the invention, uses of a crystalline salt of R-ketorolac and meglumine in the preparation of a medicament comprising a therapeutically effective amount of a crystalline salt of R-ketorolac and meglumine are provided.

In additional aspects of the invention, uses of a crystalline salt of R-ketorolac and tromethamine in the preparation of a medicament comprising a therapeutically effective amount of a crystalline salt of R-ketorolac and tromethamine are provided.

In further aspects of the invention, compositions comprising a crystalline salt of R-ketorolac and meglumine in a therapeutically effective amount for use in the treatment of cancer in a patient are provided.

In further aspects of the invention, compositions comprising a crystalline salt of R-ketorolac and tromethamine in a therapeutically effective amount for use in the treatment of cancer in a patient are provided.

DETAILED DESCRIPTION

Figure 1:
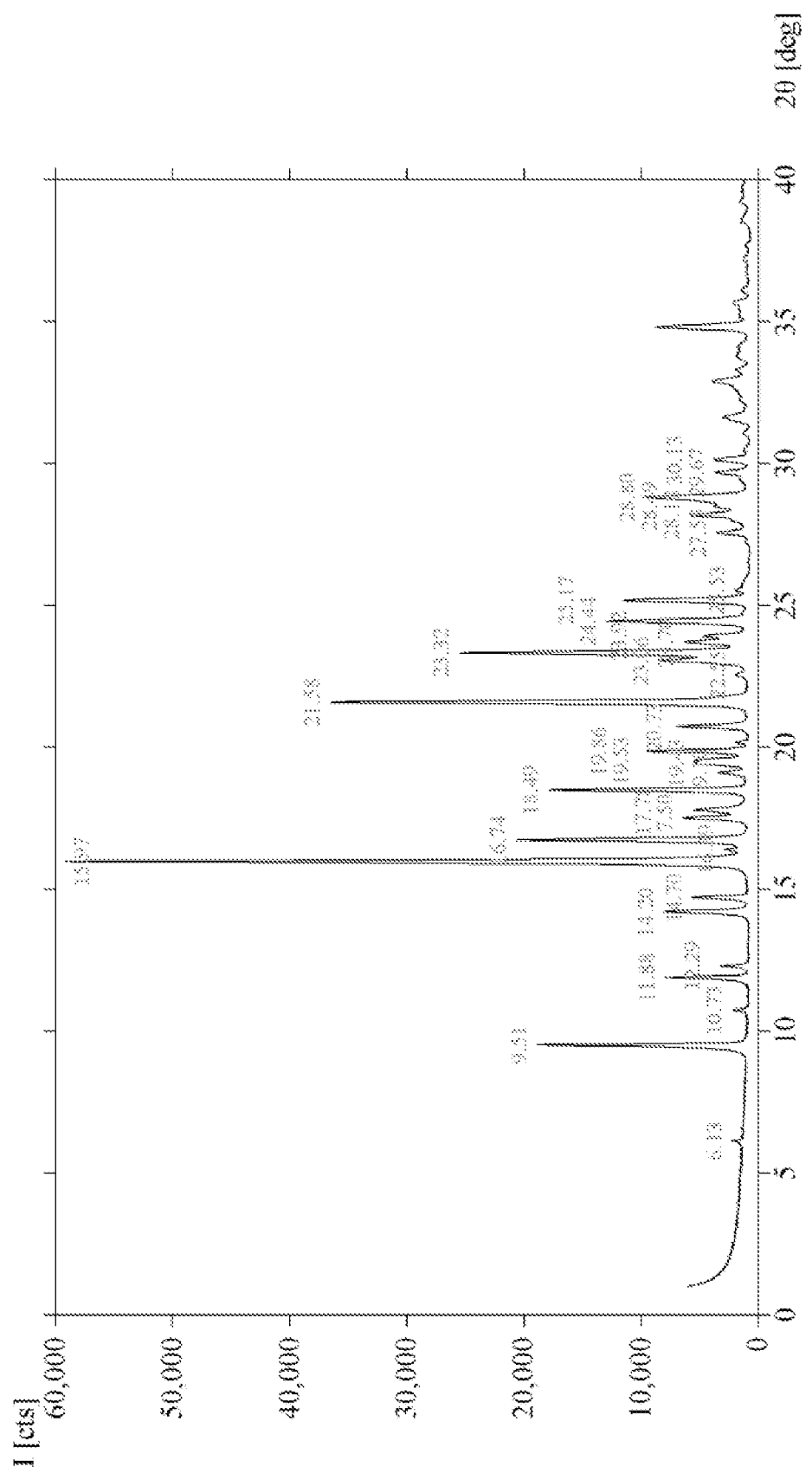
FIG. 1 is an x-ray powder diffraction pattern of an R-ketorolac tromethamine salt.

In order to identify the presence of a particular crystalline salt, one of ordinary skill typically uses a suitable analytical technique to collect data on the form for analysis. For example, chemical identity of solid forms can often be determined with solution-state techniques such as $^1$H-NMR spectroscopy and such techniques may also be valuable in determining the presence of a salt in solution.

Solution-state analytical techniques do not provide information about the solid state as a substance and thus, for example, solid-state techniques may be used to characterize solid materials such as solid salts including crystalline salts. Examples of solid-state techniques which may be used to analyze and characterize such materials include x-ray powder diffraction pattern ("XRPD"), and thermal techniques such as Differential Scanning calorimetry (DSC), Thermogravimetric analysis (TGA), and Dynamic Vapor Sorption (DVS).

X-ray powder diffraction patterns are some of the most commonly used solid-state analytical techniques used to characterize solid forms. An x-ray powder diffraction pattern is an x-y graph with °2θ (diffraction angle) on the x-axis and intensity on the y-axis. The peaks within this plot may be used to characterize a crystalline solid form. The data is often represented by the position of the peaks on the x-axis rather than the intensity of peaks on the y-axis because peak intensity can be particularly sensitive to sample orientation (see Pharmaceutical Analysis, Lee & Web, pp. 255-257 (2003)). Thus, intensity is not typically used by those skilled in the art to characterize solid forms.

As with any data measurement, there is variability in x-ray powder diffraction data. In addition to the variability in peak intensity, there is also variability in the position of peaks on the x-axis. This variability can, however, typically be accounted for when reporting the positions of peaks for purposes of characterization. Such variability in the position of peaks along the x-axis derives from several sources. One comes from sample preparation. Samples of the same crystalline material, prepared under different conditions may yield slightly different diffractograms. Factors such as particle size, moisture content, solvent content, and orientation may all affect how a sample diffracts x-rays. Another source of variability comes from instrument parameters. Different x-ray instruments operate using different parameters and these may lead to slightly different diffraction patterns from the same crystalline solid form. Likewise, different software packages process x-ray data differently and this also leads to variability. These and other sources of variability are known to those of ordinary skill in the pharmaceutical arts.

Due to such sources of variability, it is common to recite x-ray powder diffraction peaks using the word "about" prior to the peak value in °2θ which presents the data to within 0.1 or 0.2°2θ of the stated peak value depending on the circumstances. The x-ray powder diffraction data corresponding to the solid forms of the invention were collected on instruments which were routinely calibrated and operated by skilled scientists. Accordingly, the variability associated with these data would be expected to be closer to ±0.1°2θ than to ±0.2°2θ and indeed likely less than 0.1 with the instruments used herein. However, to take into account that instruments used elsewhere by those of ordinary skill in the art may not be so maintained, for example, all x-ray powder diffraction peaks cited herein have been reported with a variability on the order of ±0.2°2θ and are intended to be reported with such a variability whenever disclosed herein and are reported in the specification to one significant figure after the decimal even though analytical output may suggest higher precision on its face.

Thermal methods are another typical technique to characterize solid forms such as salts. Different polymorphs of the same compound often have different endothermic events such as when measured by DSC. Such events may include melting. As with any analytical technique, melting point determinations are also subject to variability. Common sources of variability, in addition to instrumental variability, are due to colligative properties such as the presence of other solid forms or other impurities within a sample whose melting point is being measured.

In certain embodiments of the invention, a salt of R-ketorolac and tromethamine is provided. In further embodiments, the salt is a solid salt. In some of these embodiments, the solid salt of R-ketorolac and tromethamine is a crystalline salt of R-ketorolac and tromethamine. A crystalline salt of R-ketorolac and tromethamine may be characterized by one or more peaks in the x-ray powder diffraction pattern of FIG. 1, other than the peak at 20.18°2θ (not picked) which is due to the presence of tromethamine. Table 1 shows peaks that were observed in the x-ray powder diffraction pattern of R-ketorolac tromethamine:

TABLE 1

| Observed peaks for Ketorolac tromethamine | | |
|---|---|---|
| °2θ | d space (Å) | Intensity (%) |
| 6.13 ± 0.20 | 14.403 ± 0.469 | 4 |
| 9.51 ± 0.20 | 9.293 ± 0.195 | 32 |
| 10.73 ± 0.20 | 8.237 ± 0.153 | 4 |
| 11.88 ± 0.20 | 7.442 ± 0.125 | 13 |
| 12.29 ± 0.20 | 7.196 ± 0.117 | 5 |
| 14.20 ± 0.20 | 6.232 ± 0.087 | 13 |
| 14.70 ± 0.20 | 6.020 ± 0.081 | 9 |
| 15.97 ± 0.20 | 5.545 ± 0.069 | 100 |
| 16.39 ± 0.20 | 5.402 ± 0.065 | 5 |
| 16.74 ± 0.20 | 5.293 ± 0.063 | 35 |
| 17.50 ± 0.20 | 5.062 ± 0.057 | 11 |
| 17.78 ± 0.20 | 4.985 ± 0.056 | 9 |
| 18.49 ± 0.20 | 4.795 ± 0.051 | 30 |
| 19.10 ± 0.20 | 4.643 ± 0.048 | 6 |
| 19.43 ± 0.20 | 4.564 ± 0.047 | 9 |
| 19.53 ± 0.20 | 4.542 ± 0.046 | 9 |
| 19.86 ± 0.20 | 4.467 ± 0.045 | 16 |
| 20.73 ± 0.20 | 4.282 ± 0.041 | 12 |
| 21.58 ± 0.20 | 4.114 ± 0.038 | 62 |
| 22.55 ± 0.20 | 3.940 ± 0.034 | 3 |
| 23.06 ± 0.20 | 3.854 ± 0.033 | 14 |
| 23.32 ± 0.20 | 3.811 ± 0.032 | 43 |
| 23.70 ± 0.20 | 3.751 ± 0.031 | 11 |
| 23.92 ± 0.20 | 3.718 ± 0.031 | 8 |
| 24.44 ± 0.20 | 3.639 ± 0.029 | 22 |
| 25.17 ± 0.20 | 3.536 ± 0.028 | 20 |
| 25.53 ± 0.20 | 3.486 ± 0.027 | 3 |
| 27.55 ± 0.20 | 3.235 ± 0.023 | 6 |
| 28.18 ± 0.20 | 3.164 ± 0.022 | 10 |
| 28.49 ± 0.20 | 3.131 ± 0.022 | 6 |
| 28.80 ± 0.20 | 3.097 ± 0.021 | 16 |
| 29.67 ± 0.20 | 3.008 ± 0.020 | 6 |
| 30.13 ± 0.20 | 2.964 ± 0.019 | 6 |

In many embodiments, one or more peaks at about 6.1°2θ, about 9.5°2θ, about 11.9°2θ, about 14.2°2θ, about 14.7°2θ, about 16.0°2θ, about 16.8°2θ, about 18.5°2θ, about 21.6°2θ, and about 23.3°2θ may be used to characterize the salt. For example, one or more of the peaks at about 6.1°2θ, about 11.9°2θ, about 14.2°2θ or about 14.7°2θ may be used to characterize a crystalline R-ketorolac tromethamine salt. In some embodiments, for example, the peaks at about 9.5°2θ and about 16.0°2θ may be used to characterize a crystalline R-ketorolac tromethamine salt. In other embodiments, the peak at about 9.5°2θ may be used. In other embodiments the peak at about 6.1°2θ may be used. In still other embodiments, the peaks at about 6.1°2θ and at about 9.5°2θ may be used. In additional embodiments, the peaks at about 6.1°2θ and at about 9.5°2θ, together with one or more of the peaks at about 11.9°2θ, about 14.2°2θ, about 14.7°2θ, about 16.0°2θ, about 16.8°2θ, about 18.5°2θ, about 21.6°2θ, and about 23.3°2θ may be used for such characterization.

Figure 3:
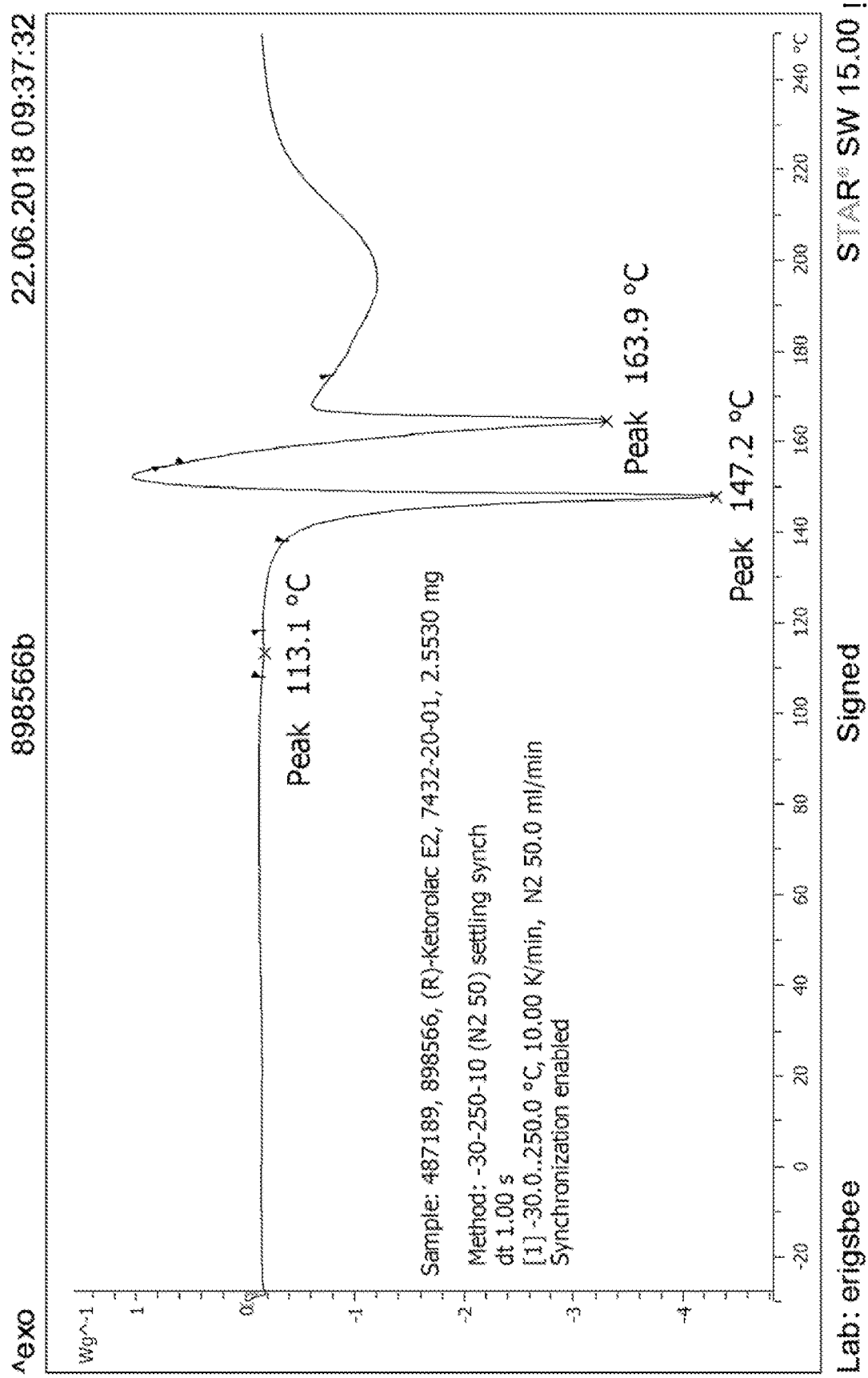
FIG. 3 is a DSC thermogram of an R-ketorolac tromethamine salt.

Differential scanning calorimetry, alone or in combination with x-ray powder diffraction, may be used to characterize a crystalline R-ketorolac tromethamine salt. Crystalline R-ketorolac tromethamine has a DSC endotherm peak at about 147° C. (FIG. 3). It also has a DSC endotherm peak at about 164° C. Thus, a crystalline R-ketorolac tromethamine salt may be characterized by a DSC thermogram at about 147° C. alone or in combination with (i) a DSC endotherm peak at about 164° C. and (ii) one or more x-ray powder diffraction peaks at about 6.1°2θ, about 9.5°2θ, about 11.9°2θ, about 14.2°2θ, about 14.7°2θ, about 16.0°2θ, about 16.8°2θ, about 18.5°2θ, about 21.6°2θ, and about 23.3°2θ. Likewise, crystalline R-ketorolac tromethamine may be characterized by a DSC endotherm peak at about 164° C. alone or in combination with (i) a DSC endotherm peak at about 147° C. and (ii) one or more x-ray powder diffraction peaks at about 6.1°2θ, about 9.5°2θ, about 11.9°2θ, about 14.2°2θ, about 14.7°2θ, about 16.0°2θ, about 16.8°2θ, about 21.6°2θ, and about 23.3°2θ. A crystalline R-ketorolac tromethamine salt may also be characterized by the entire x-ray powder diffraction pattern such as that is found in FIG. 1 or the entire DSC thermogram as found in FIG. 3 or both FIG. 1 and FIG. 3.

Figure 6:
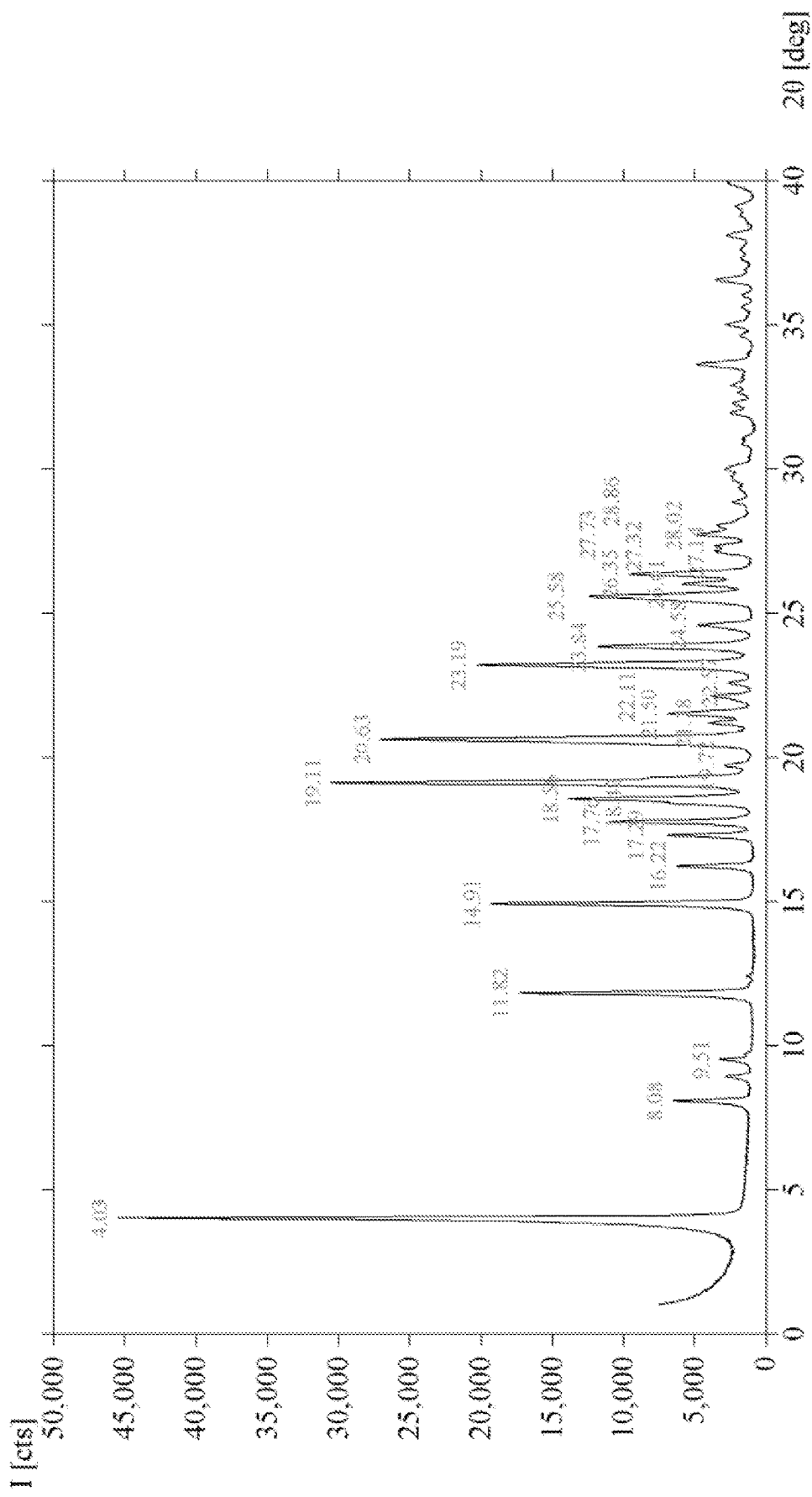
FIG. 6 is an x-ray powder diffraction pattern of an R-ketorolac meglumine salt.

In many embodiments of the invention, a solid salt of R-ketorolac and meglumine is provided. In many of these embodiments, a crystalline salt of R-ketorolac and meglumine is provided. A crystalline salt of R-ketorolac and meglumine may be characterized by one or more peaks in the x-ray powder diffraction pattern of FIG. 6 other than the peaks at 8.9°2θ (unpicked), 9.73°2θ (unpicked), and 12.43°2θ (unpicked) which are due to the presence of meglumine. Table 2 shows the observed in the x-ray powder diffraction pattern of R-ketorolac meglumine:

TABLE 2

Observed peaks for Ketorolac meglumine

| °2θ | d space (Å) | Intensity (%) |
|---|---|---|
| 4.03 ± 0.20 | 21.922 ± 1.088 | 100 |
| 8.08 ± 0.20 | 10.938 ± 0.270 | 14 |
| 9.51 ± 0.20 | 9.291 ± 0.195 | 7 |
| 11.82 ± 0.20 | 7.479 ± 0.126 | 38 |
| 14.91 ± 0.20 | 5.937 ± 0.079 | 43 |
| 16.22 ± 0.20 | 5.462 ± 0.067 | 14 |
| 17.29 ± 0.20 | 5.126 ± 0.059 | 15 |
| 17.76 ± 0.20 | 4.990 ± 0.056 | 24 |
| 18.42 ± 0.20 | 4.814 ± 0.052 | 15 |
| 18.56 ± 0.20 | 4.778 ± 0.051 | 31 |
| 19.11 ± 0.20 | 4.639 ± 0.048 | 67 |
| 19.72 ± 0.20 | 4.498 ± 0.045 | 6 |
| 20.63 ± 0.20 | 4.302 ± 0.041 | 60 |
| 21.18 ± 0.20 | 4.191 ± 0.039 | 9 |
| 21.50 ± 0.20 | 4.130 ± 0.038 | 15 |
| 22.11 ± 0.20 | 4.018 ± 0.036 | 8 |
| 22.57 ± 0.20 | 3.937 ± 0.034 | 6 |
| 23.19 ± 0.20 | 3.832 ± 0.033 | 45 |
| 23.84 ± 0.20 | 3.730 ± 0.031 | 26 |
| 24.58 ± 0.20 | 3.619 ± 0.029 | 11 |
| 25.58 ± 0.20 | 3.480 ± 0.027 | 27 |
| 26.01 ± 0.20 | 3.423 ± 0.026 | 13 |
| 26.35 ± 0.20 | 3.379 ± 0.025 | 21 |
| 27.14 ± 0.20 | 3.283 ± 0.024 | 8 |
| 27.32 ± 0.20 | 3.262 ± 0.023 | 8 |
| 27.73 ± 0.20 | 3.215 ± 0.023 | 11 |
| 28.02 ± 0.20 | 3.182 ± 0.022 | 8 |
| 28.86 ± 0.20 | 3.091 ± 0.021 | 5 |

Figure 8:
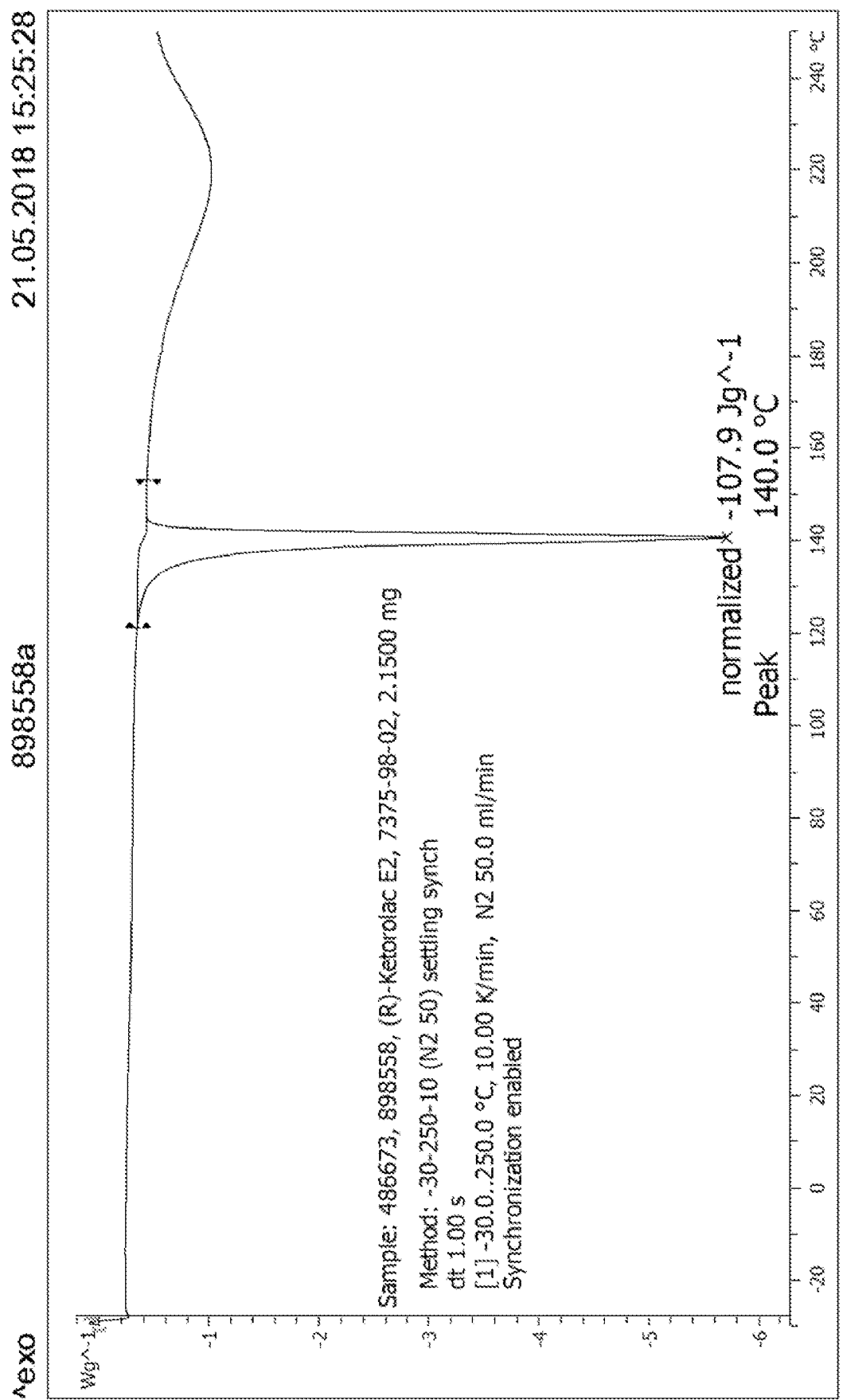
FIG. 8 is a DSC thermogram of an R-ketorolac meglumine salt.

For example, one or more peaks at about 4.0°2θ, about 8.1°2θ, about 11.8°2θ, about 14.9°2θ, about 18.6°2θ, about 19.1°2θ, about 20.6°2θ, and about 23.2°2θ may be so used for characterization. In some embodiments, for example, the peaks at about 4.0°2θ and about 11.8°2θ may be used to characterize crystalline R-ketorolac meglumine. In other embodiments, the peaks at about 4.0°2θ or 8.1°2θ or 11.8°2θ or 14.9°2θ may be used. In still further embodiments one or more of the peaks at about 4.0°2θ or 8.1°2θ or 11.8°θ or 14.9°2θ together with one or more of the peaks at about 18.6°2θ, about 19.1°2θ, about 20.6°2θ, and about 23.2°2θ may be so used to characterize R-ketorolac meglumine. Differential scanning calorimetry, alone or in combination with x-ray powder diffraction, may be used to characterize crystalline R-ketorolac meglumine salt. A salt of crystalline R-ketorolac meglumine has a DSC endotherm peak at about 140° C. (FIG. 8). Thus, a crystalline R-ketorolac meglumine salt may be characterized by a DSC thermogram at about 140° C. alone or in combination with one or more x-ray powder diffraction peaks at about 4.0°2θ, about 8.1°2θ, about 11.8°2θ, about 14.9°2θ, about 18.6°2θ, about 19.1°2θ, about 20.6°2θ and about 23.2°2θ. A crystalline R-ketorolac meglumine salt may also be characterized by the entire x-ray powder diffraction pattern such as that is found in FIG. 6 or the entire DSC thermogram as found in FIG. 8 or both FIG. 6 and FIG. 8.

The R-ketorolac salts of the invention may be prepared, for example, by suspending R-ketorolac in a suitable solvent and by adding the corresponding salt former to the suspension. The suspension may be slurried for sufficient time so as to form the corresponding salt, solid salt, or crystalline salt of R-ketorolac and the salt former. Examples of suitable solvents include ethyl acetate, acetone, t-butyl methyl ether, ethanol, methyl iso-butyl ketone, diisopropyl ether, methanol, isobutanol, and acetonitrile. The suspension may be achieved at room temperature or elevated temperature such as between 25° C. and about 60° C. depending on the solvent. For example, slurrying at between about 50° C. and about 60° C. may yield the corresponding salt. The amount of salt former used is often the stoichiometric amount or in stoichiometric excess of up to about 10%.

R-ketorolac free acid has the molecular formula $C_{15}H_{13}NO_3$ and a molecular weight of 255.27. In some aspects the enantiomeric purity of the R-ketorolac component of the salt is at least 95%, at least 97%, at least 98% or at least 99%. The pharmacologic activity of R-ketorolac has been previously described. See Guo et al. Clin Cancer Res. (2015) November 15; 21(22); 5064-72 and Oprea et al. (2015) PLoS ONE 10(11): e0142182.

The R-ketorolac salts of the invention may be formulated into pharmaceutical formulations by conventional methods for delivery to patients in need thereof. Such pharmaceutical compositions may be comprised of one or more pharmaceutically acceptable excipients and an R-ketorolac salt of the invention such as with R-ketorolac, namely meglumine or tromethamine. The pharmaceutical compositions may be administered orally to patients in need thereof. Alternatively, the pharmaceutical compositions may be administered, parenterally, topically, nasally, ophthalmically, optically, sublingually, rectally, vaginally, and the like.

The salts of R-ketorolac disclosed herein may be used to treat cancer. For example, the R-ketorolac salts of tromethamine, meglumine, or both may be used to treat cancers that are driven by the dysregulation of Cdc42 and/or Rac1 such as ovarian cancer. Other examples of suitable types of cancer for treatment by such salt forms of R-ketorolac include gastric cancer, colorectal cancer, pancreatic cancer, prostate cancer, lymphoma and melanoma.

The following clauses represent various embodiments od the disclosure and are not meant to be limiting.

Clause 1. A salt of R-ketorolac and tromethamine.

Clause 2. A crystalline salt of R-ketorolac and tromethamine.

Clause 3. A salt of R-ketorolac and meglumine.

Clause 4. A crystalline salt of R-ketorolac and meglumine.

Clause 5. The crystalline of salt of clause 2 having an x-ray powder diffraction pattern comprising one or more peaks at about 6.1°2θ, about 9.5°2θ, about 11.9°2θ, about 14.2°2θ, about 14.7°2θ, about 16.0°2θ, about 16.8°2θ, about 18.5°2θ, about 21.6°2θ, and about 23.3°2θ.

Clause 6. The crystalline salt of clause 2 having an x-ray powder diffraction pattern comprising a peak at about 6.1°2θ.

Clause 7. The crystalline salt of clause 2 having an x-ray powder diffraction pattern comprising a peak at about 9.5°2θ.

Clause 8. The crystalline salt of clause 2 having an x-ray powder diffraction pattern comprising a peak at about 6.1°2θ and a peak at about 9.5°2θ.

Clause 9. The crystalline salt of any one of clauses 6-8 having an x-ray powder diffraction pattern further comprising a peak at about 11.9°2θ.

Clause 10. The crystalline salt of any one of clauses 6-9 having an x-ray powder diffraction pattern further comprising a peak at about 14.2°2θ.

Clause 11. The crystalline salt of any one of clauses 6-10 having an x-ray powder diffraction pattern further comprising a peak at about 14.7°2θ.

Clause 12. The crystalline salt of any one of clauses 6-11 having an x-ray powder diffraction pattern further comprising a peak at about 16.0°2θ.

Clause 13. The crystalline salt of any one of clauses 6-12 having an x-ray powder diffraction pattern further comprising a peak at about 16.8°2θ.

Clause 14. The crystalline salt of any one of clauses 6-13 having an x-ray powder diffraction pattern further comprising a peak at about 18.5°2θ.

Clause 15. The crystalline salt of any one of clauses 6-14 having an x-ray powder diffraction pattern further comprising a peak at about 21.6°2θ.

Clause 16. The crystalline salt of any one of clauses 6-15 having an x-ray powder diffraction pattern further comprising a peak at about 23.3°2θ.

Clause 17. The crystalline salt of clause 2, comprising one or more peaks at about 6.1°2θ, about 11.9°2θ, about 14.2°2θ, or about 14.7°2θ.

Clause 18. The crystalline salt of any one of clauses 2 or 5-17 having a DSC thermogram having a DSC endotherm peak at about 147° C.

Clause 19. The crystalline salt of any one of clauses 2 or 5-18 having a DSC thermogram having a DSC endotherm peak at about 164° C.

Clause 20. The crystalline salt of clause 2, having an x-ray powder diffraction pattern substantially the same as FIG. 1.

Clause 21. The crystalline salt of any one of clauses 2, 5-17 or 20 having a DSC thermogram substantially the same as FIG. 3.

Clause 22. The crystalline salt of clause 4, having an x-ray powder diffraction pattern comprising one or more peaks at about 4.0°2θ, about 8.1°2θ, about 11.8°2θ, about 14.9°2θ, about 18.6°2θ, about 19.1°2θ, about 20.6°2θ, and about 23.2°2θ.

Clause 23. The crystalline salt of clause 4, having an x-ray powder diffraction pattern comprising a peak at about 4.0°2θ.

Clause 24. The crystalline salt of clause 4, having an x-ray powder diffraction pattern comprising a peak at about 8.1°2θ.

Clause 25. The crystalline salt of clause 4, having an x-ray powder diffraction pattern comprising a peak at about 11.8°2θ.

Clause 26. The crystalline salt of clause 4, having an x-ray powder diffraction pattern comprising a peak at about 14.9°2θ.

Clause 27. The crystalline salt of any one of clauses 23-26, having an x-ray powder diffraction pattern further comprising a peak at about 18.6°2θ.

Clause 28. The crystalline salt of any one of clauses 23-27, having an x-ray powder diffraction pattern further comprising a peak at about 19.1°2θ.

Clause 29. The crystalline salt of any one of clauses 23-28, having an x-ray powder diffraction pattern further comprising a peak at about 20.6°2θ.

Clause 30. The crystalline salt of any one of clauses 23-29, having an x-ray powder diffraction pattern further comprising a peak at about 23.2°2θ.

Clause 31. The crystalline salt of any one of clauses 4 or 22-30 having a DSC thermogram comprising a DSC endothermic peak at about 140° C.

Clause 32. The crystalline salt of clause 4 having an x-ray powder diffraction pattern substantially the same as FIG. 6.

Clause 33. The crystalline salt of any one of clauses 4, 22-30 or 32 having substantially the same DSC thermogram as FIG. 8.

Clause 34. A solid salt of R-ketorolac and tromethamine.

Clause 35. A solid salt of R-ketorolac and meglumine.

Clause 36. A pharmaceutical composition comprising an R-ketorolac salt of any one of clauses 1-35 and a pharmaceutically acceptable excipient.

Clause 37. A method of treating cancer comprising administering to a patient in need thereof an effective amount of a salt of R-ketorolac of any one of clauses 1-35 or a pharmaceutical composition of clause 36.

Clause 38. Use of a crystalline salt of R-ketorolac and meglumine in the treatment of cancer in a patient.

Clause 39. Use of a crystalline salt of R-ketorolac and tromethamine in the treatment of cancer in a patient.

Clause 40. Use of a crystalline salt of R-ketorolac and meglumine in the preparation of a medicament comprising a therapeutically effective amount of a crystalline salt of R-ketorolac and meglumine.

Clause 41. Use of a crystalline salt of R-ketorolac and tromethamine in the preparation of a medicament comprising a therapeutically effective amount of a crystalline salt of R-ketorolac and tromethamine.

Clause 42. A composition comprising a crystalline salt of R-ketorolac and meglumine in a therapeutically effective amount for use in the treatment of cancer in a patient.

Clause 43. A composition comprising a crystalline salt of R-ketorolac and tromethamine in a therapeutically effective amount for use in the treatment of cancer in a patient.

EXPERIMENTALS

A salt screen was conducted with R-ketorolac. In many instances, no solids were found. In some cases, solids were found, but were so hygroscopic, they were unsuitable for development. In contrast, two suitable crystalline salts were formed with tromethamine and meglumine. Salt formation experiments were conducted utilizing various crystallization techniques and solvent systems. Isolated solids were typically observed by polarized light microscopy and analyzed by x-ray powder diffraction pattern ("XRPD"). The XRPD patterns were compared to each other and to the patterns of the starting material and available patterns of salt formers to confirm that crystalline salts had been created. Further characterization was conducted on solids exhibiting unique crystalline XRPD patterns. R-ketorolac was used either as received or purified.

Example 1 Preparation of Crystalline R-Ketorolac Tromethamine Salt

In one experiment, R-ketorolac (69.6 mg), was suspended in 1 mL of ethyl acetate at ambient temperature. 1.1 equivalents of tromethamine (37.2 mg) were then added. The suspension was slurried at ambient temperature for one week. Solids were isolated via vacuum filtration. The sample also contained small amounts of free tromethamine and tromethamine HCl.

In another experiment, R-ketorolac (176.5 mg), was suspended in 1.5 mL of anhydrous acetone at ambient temperature. 1.1 equivalents of tromethamine (92.5 mg) were then added and the suspension was slurried at ambient temperature for four days. Solids were isolated via vacuum filtration. The sample also contained small amounts of free tromethamine. FIG. 1 shows the x-ray powder diffraction pattern of the R-ketorolac tromethamine salt. The Figure shows the observed peaks for XRPD file 895217 collected with Cu-Kα radiation, with output rendered using Triads™ v2.0.

In a further experiment, R-ketorolac (98.4 mg), was suspended in 1.5 mL of ethyl acetate at 55° C. 1.1 equivalents of tromethamine (49.9 mg) were dissolved in 0.8 mL of trifluoroethanol at 55° C. and added to the ethyl acetate suspension while hot. The suspension was slurried at 55° C. for three days and then slowly cooled to ambient temperature. It was further slurried at ambient temperature for one day. Solids were isolated via vacuum filtration. The sample also contained small amounts of tromethamine HCl.

Figure 4:
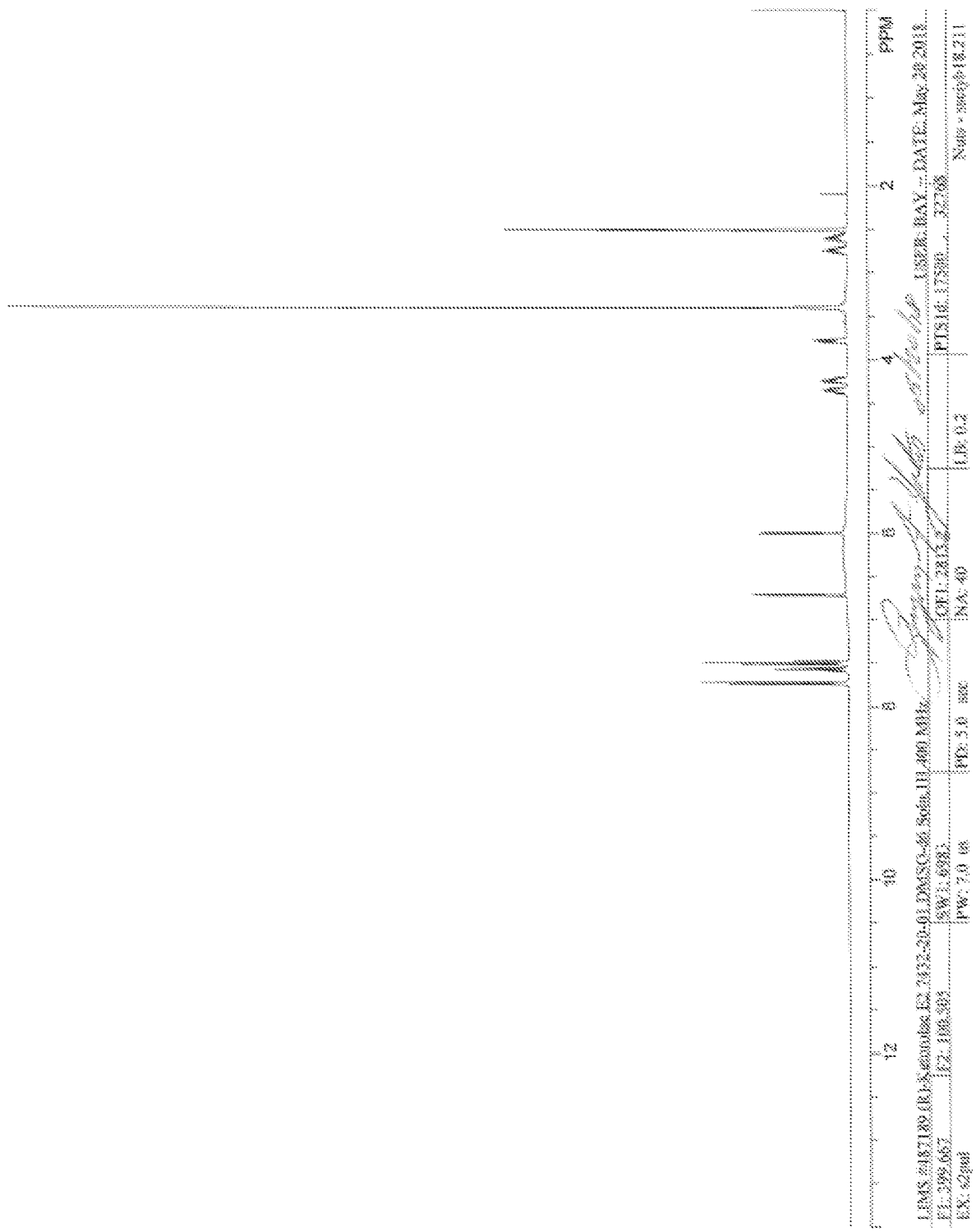
FIG. 4 is a $^1$H-NMR spectrum of an R-ketorolac tromethamine salt.
Figure 5:
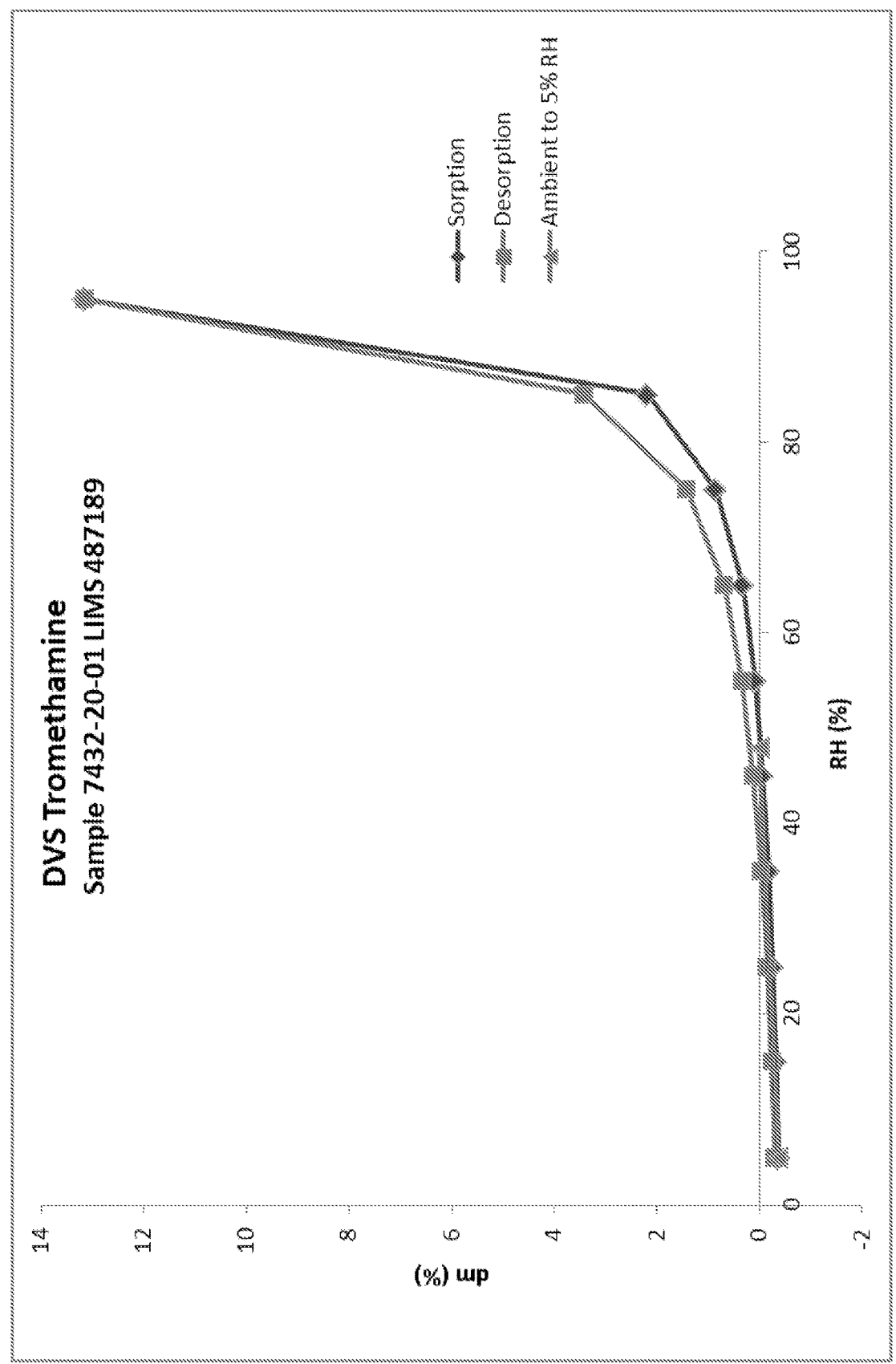
FIG. 5 is a DVS plot of an R-ketorolac tromethamine salt.

In an additional experiment, R-ketorolac (92.7 mg), was dissolved in 1 mL of acetone at 50° C. 1.1 equivalents of tromethamine (48.0 mg) were then added at elevated temperature. The resulting suspension was slurried at 50° C. for one day and then cooled to ambient temperature. It was slurried at ambient temperature for three days. Solids were isolated via vacuum filtration. The sample also contained some additional unidentified peaks in this sample's x-ray powder diffraction pattern. Thermogravimetric analysis (FIG. 2), Differential Scanning calorimetry (FIG. 3), $^1$H-NMR spectroscopy (FIG. 4), and Dynamic Vapor Sorption analyses (FIG. 5) were collected on the R-ketorolac tromethamine so prepared.

Based on XRPD data, the samples generated were primarily composed of one crystalline phase but contained either tromethamine, tromethamine HCl, or an unidentified crystalline phase, each as a minor component. The sample that was produced from slurry in acetone, and contained a small amount of free tromethamine, was selected for indexing. Taking into consideration the known peak positions for tromethamine, the pattern was indexed, confirming the generated sample is mostly composed of a single crystalline phase. The crystalline salt of tromethamine and R-ketorolac has a monoclinic unit cell containing two molecules of ketorolac. The unit cell volume, calculated from the indexing solution, is consistent with one mole of tromethamine per molecule of ketorolac and does not indicate room for solvent. The peak at 20.18°2θ is attributed to tromethamine.

Figure 2:
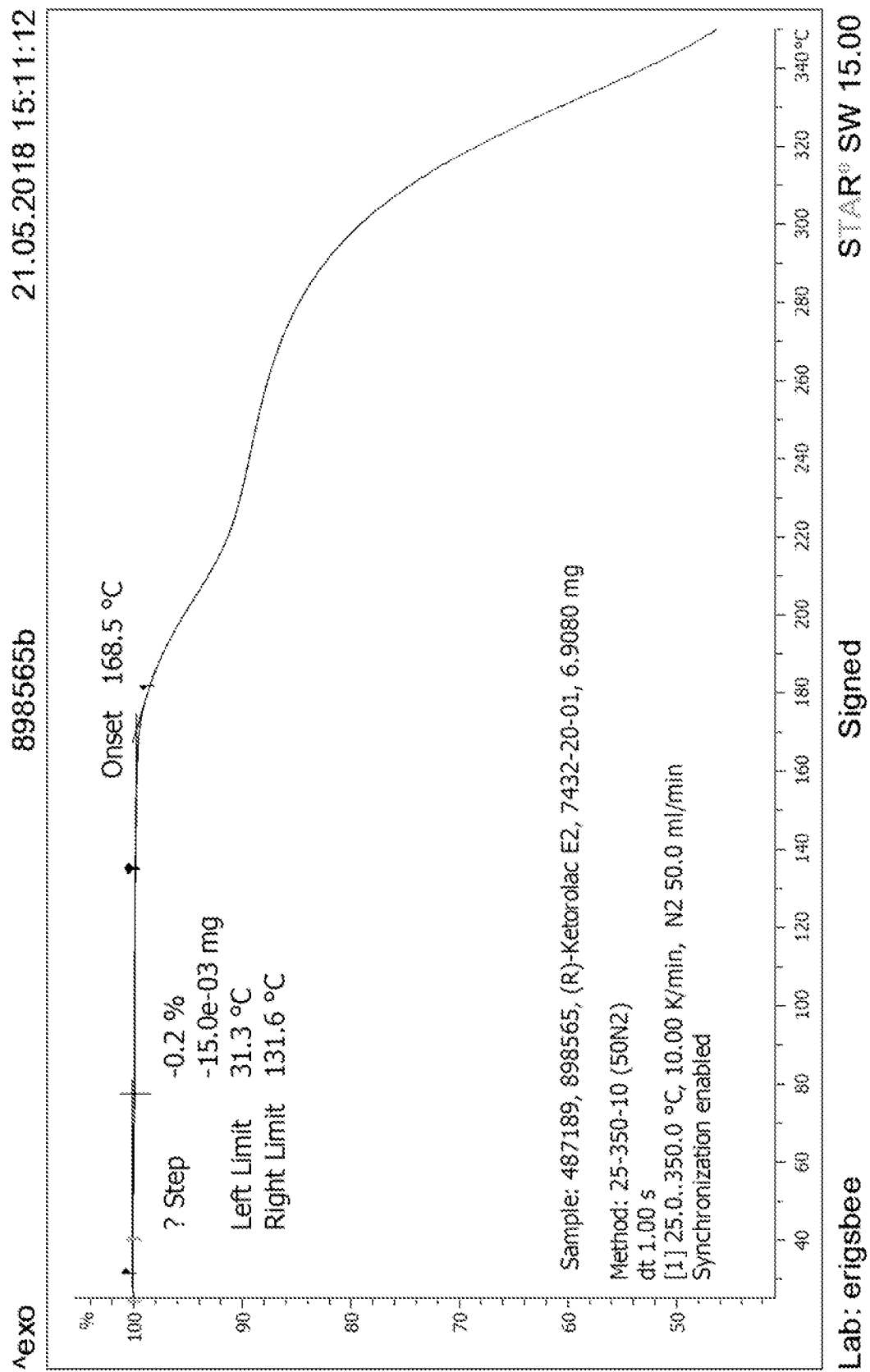
FIG. 2 is a TGA thermogram of an R-ketorolac tromethamine salt.

The $^1$H-NMR spectrum (FIG. 4) is consistent with the chemical structure of ketorolac containing a tromethamine counterion with 1:1 mol:mol stoichiometry, based on the peak at 3.4 ppm. A peak attributable to the hydrogen adjacent to the carboxylic acid of ketorolac, originally observed in the $^1$H-NMR spectrum of the free acid at 4.1 ppm, is now significantly shifted, indicative of salt formation near that location. A trace amount of acetone is present in the sample (0.01 mol:mol), based on the peak at 2.09 ppm. No impurities are apparent. The TGA thermogram shows a 0.2 wt % loss from 31° C. to 132° C., likely due to loss of water (<0.1 mole) since no appreciable amounts of organic solvent were observed by NMR (FIG. 2). The large weight loss with onset at 169° C. is typical of decomposition. The DSC thermogram (FIG. 3) displays a small, broad endotherm at 113° C. (peak max), concurrent with the weight loss observed by TGA and likely due to loss of water. The two sharp endotherms, present at 147° C. and 164° C. (peak max), are attributable to melt/recrystallization and second melt, as confirmed by hotstage microscopy. To further investigate the nature of events observed by DSC, R-ketorolac tromethamine salt was analyzed by hotstage microscopy. Solids were heated at 10° C./minute until ~130° C., at which point the heating rate was decreased to 5° C./minute. It should be noted that an increase in birefringence was observed at ~83° C., though no events are apparent by DSC. No further changes were seen in the sample until the onset of the first melt at 141° C. Melting continued through 147° C. and, at 148° C., recrystallization began and was complete by 152° C. No additional changes were observed prior to the onset of the second melt at 162° C. Melting was complete by 166° C. Upon cooling to ambient temperature, the sample recrystallized. Solids were therefore re-heated at 20° C./minute until ~128° C., and then at 10° C./minute for the remainder of the analysis. Recrystallization of remaining glass occurred at 142° C., and was followed by melting at 159° C. (onset). Melting was complete by 166° C., with no visual signs of discoloration.

DVS analysis (FIG. 5) was conducted by first equilibrating at ambient RH, and then dropping to 5% RH. It was then increased to 95% RH and cycled back to 5% RH. The sample was held at 5% RH until XRPD analysis. Upon equilibration from ambient RH (~48%) to 5% RH, the sample loses 0.4 wt %, equivalent to ~0.1 moles of $H_2O$. From 5-75% RH, the material undergoes a 1.2 wt % gain (~0.25 moles of $H_2O$). Above 75% RH, the material gains ~12 wt % (~3 moles of $H_2O$). Upon desorption to 5% RH, which occurs with only a small hysteresis, all the gained moisture is lost and form change is not observed, based on XRPD data.

Example 2—Crystalline Salt of R-Ketorolac and Meglumine

R-Ketorolac (74.0 mg), was dissolved in 1 mL of isopropanol and heated at 60° C. 1.1 equivalents of meglumine (6.4 mg) were added at elevated temperature. The sample was triturated with heptane and tert-butyl methyl ether and stirred at 60° C. for two days before slowly cooling to ambient temperature. Solids were isolated via vacuum filtration. The sample also contains small amounts of meglumine HCl.

In another experiment, R-ketorolac (90.8 mg), was suspended in 2 mL of tert-butyl methyl ether at ambient temperature. 1.1 equivalents of meglumine (78.2 mg) were dissolved in 0.5 mL of hexafluoroisopropanol and added to the suspension. The suspension was slurried at ambient temperature for six days. Solids were isolated via vacuum filtration. The sample also contains small amounts of meglumine HCl.

In a further experiment, R-ketorolac (182.8 mg), was suspended in 2 mL of tert-butyl methyl ether at ambient temperature. 1.1 equivalents of meglumine (150.1 mg) was dissolved in 0.8 mL of hexafluoroisopropanol and added to the suspension. The suspension was slurried at ambient temperature for six days. Solids were isolated via vacuum filtration. The sample also contains small amounts of free meglumine. An x-ray powder diffraction pattern of the R-ketorolac meglumine salt is in FIG. 6. The Figure shows the observed peaks for XRPD file 895214 collected with Cu-Kα radiation, with output rendered using Triads™ v2.0.

Figure 7:
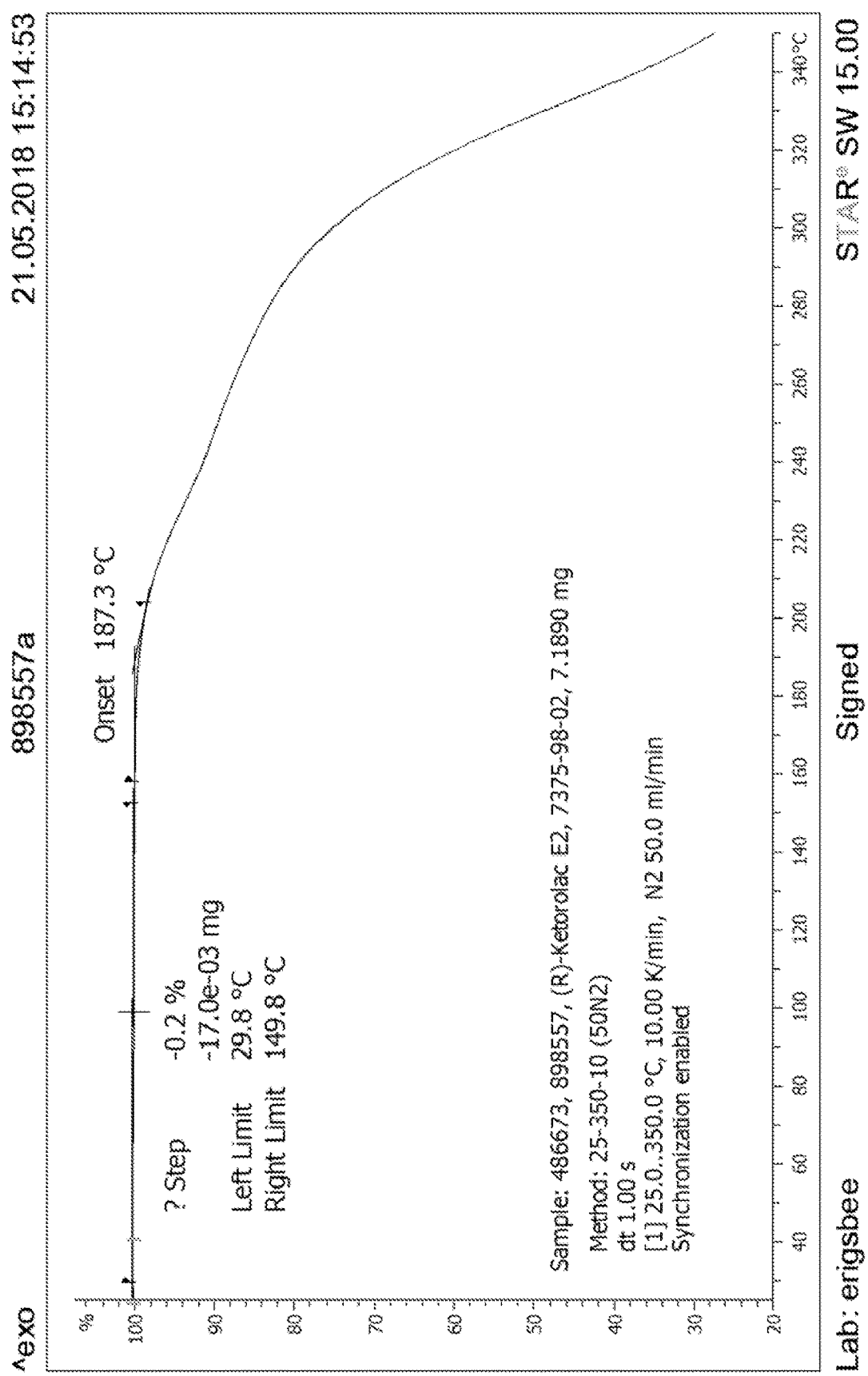
FIG. 7 is a TGA thermogram of an R-ketorolac meglumine salt.
Figure 9:
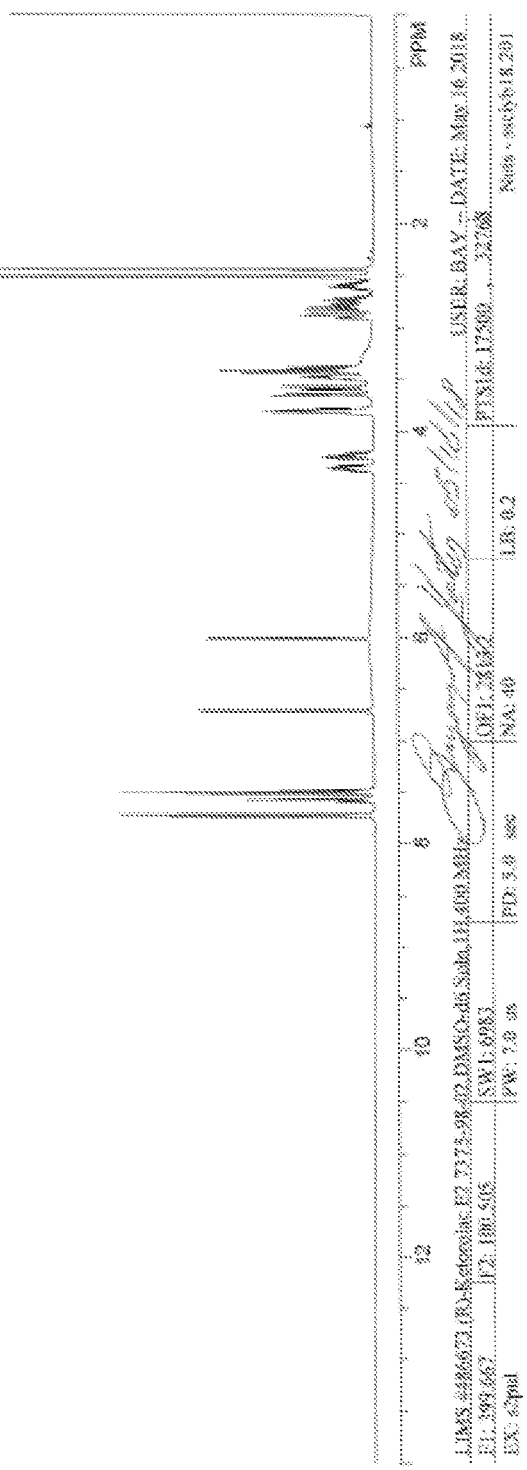
FIG. 9 is a $^1$H-NMR spectrum of an R-ketorolac meglumine salt.

In an additional experiment, ethanol (5.5 mL) was added to solids of R-ketorolac (160.6 mg), and heated at 55° C. 1.1 equivalents of meglumine (141.0 mg) were then added at elevated temperature. The suspension was slurried at 55° C. for three days and then slowly cooled to ambient temperature. It was further slurried for one day at ambient temperature. Solids were isolated via vacuum filtration. The sample also contains some unidentified peaks in the x-ray powder diffraction pattern. Thermogravimetric Analysis (FIG. 7), Differential Scanning calorimetry (FIG. 8), $^1$H-NMR Spectroscopy (FIG. 9), and Dynamic Vapor Sorption Analysis (FIG. 10) were collected on R-ketorolac meglumine so prepared.

In a further experiment, R-ketorolac (83.0 mg), was dissolved in 1.5 mL of ethanol at 50° C. 1.1 equivalents of meglumine (67.7 mg) were then added at elevated temperature. The suspension was slurried at 50° C. for three hours and then cooled to ambient temperature. It was further slurried for four days at ambient temperature. Solids were isolated via vacuum filtration. The sample also contains some unidentified peaks in the x-ray powder diffraction pattern.

Based on XRPD data, the samples generated were primarily composed of one crystalline phase but contained either meglumine, meglumine HCl, or an unidentified crystalline phase, each as a minor component. The sample produced from slurry in HFIPA/MTBE, and showed a small amount of free meglumine, was chosen for indexing. The pattern was successfully indexed, confirming the sample is mostly composed of a single crystalline phase. The crystalline salt of R-ketorolac and meglumine has a monoclinic unit cell containing two molecules of ketorolac. The unit cell volume, calculated from the indexing solution, is consistent with one mole of meglumine per molecule of ketorolac and does not indicate room for solvent. The peaks at 8.94°2θ, 9.73°2θ, and 12.43°2θ, not consistent with the indexing solution, are due to meglumine. An attempt targeting a pure phase of R-ketorolac Meglumine generated solids mostly composed of R-ketorolac meglumine salt but containing small unidentified peaks not allowed by the indexing solution. These peaks appear to be very minor, and the sample was further characterized by $^1$H-NMR, TGA, DSC, and DVS.

The $^1$H-NMR spectrum (FIG. 9) is consistent with the chemical structure of ketorolac containing a meglumine counterion with 1:1 mol:mol stoichiometry, based on the peaks at 3.4-3.8, 2.9, and 2.4 ppm. A peak attributable to the hydrogen adjacent to the carboxylic acid of ketorolac, originally observed in the $^1$H-NMR spectrum of the free acid at 4.1 ppm, is significantly shifted, indicative of salt formation near that location. A trace amount of EtOH is present (0.03 mol:mol), based on the peak at 1.06 ppm. No impurities are apparent.

The TGA thermogram (FIG. 7) shows a 0.2 wt % loss from 30° C. to 150° C., likely due to residual water (<0.1 mole) since no appreciable amounts of organic solvent were apparent by $^1$H-NMR. The large weight loss with onset at 187° C. is typical of decomposition. The DSC thermogram (FIG. 8) displays a sharp endotherm at 140° C. (peak max).

Figure 10:
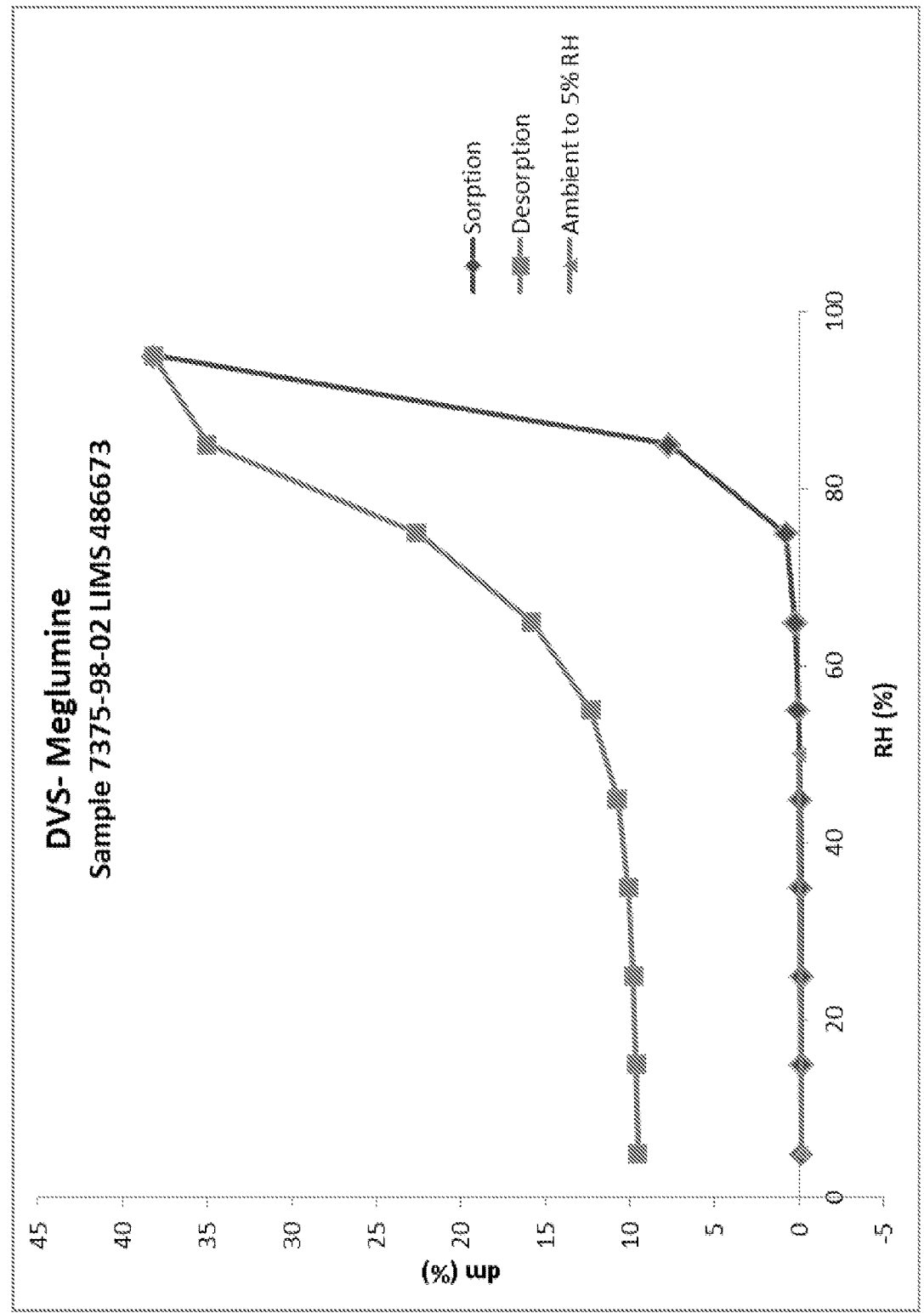
FIG. 10 is a DVS plot of an R-ketorolac meglumine salt.

The crystalline salt of R-ketorolac and meglumine was analyzed by DVS (FIG. 10). The R-ketorolac meglumine crystalline salt has limited hygroscopicity below 75% RH, above which it is highly hygroscopic. Upon equilibration from ambient RH (~50%) to 5% RH, the sample loses 0.1 wt %, equivalent to <0.1 mole of $H_2O$. From 5-75% RH, the material undergoes a 0.9 wt % gain (~0.25 moles of $H_2O$). Above 75% RH, the material gains ~37 wt % (>12 moles of $H_2O$). Upon desorption to 5% RH, which occurs with hysteresis, the sample retains ~9.6 wt % (~2.7 moles of $H_2O$). Based on XRPD of the post-DVS solids, form change is not observed.

Experimental Parameters

XRPD patterns were collected with a PANalytical X'Pert PRO MPD diffractometer using an incident beam of Cu radiation produced using an optix long, fine-focus source. An elliptically graded multilayer mirror was used to focus Cu Kα x-rays through the specimen and onto the detector. Prior to the analysis, a silicon specimen (NIST SRM 640e) was analyzed to verify the observed position of the Si 111 peak is consistent with the NIST-certified position. A specimen of the sample was sandwiched between 3-μm-thick films and analyzed in transmission geometry. A beam-stop, short antiscatter extension, and an antiscatter knife edge were used to minimize the background generated by air. Soller slits for the incident and diffracted beams were used to minimize broadening from axial divergence. Diffraction patterns were collected using a scanning position-sensitive detector (X'Celerator) located 240 mm from the specimen and Data Collector software v. 2.2b. The data acquisition parameters for each pattern are displayed above the image in the Data section of this report including the divergence slit (DS) before the mirror.

For $^1$H-NMR spectroscopy, sub-samples were sent to Spectral Data Services (SDS) for analysis. Samples were prepared in d-DMSO.

TG analyses were performed using a Mettler-Toledo TGA/DSC3+ analyzer. Temperature calibration was performed using phenyl salicylate, indium, tin, and zinc. The sample was placed in an aluminum pan. The sample was sealed, the lid pierced, then inserted into the TG furnace. The furnace was heated under nitrogen. The data acquisition parameters for the thermogram are displayed in the image in the Physical Characterization Data section of this report.

DSC was performed using a Mettler-Toledo DSC3+differential scanning calorimeter. Temperature calibration was performed using adamantane, phenyl salicylate, indium, tin, and zinc. The sample was placed into an aluminum DSC pan, covered with a lid, and the weight was accurately recorded. A weighed aluminum pan configured as the sample pan was placed on the reference side of the cell. The pan lid was pierced prior to sample analysis. The data acquisition parameters for the thermogram are displayed in the image in the Physical Characterization Data section of this report.

Moisture sorption/desorption data were collected on a VTI SGA-100 Vapor Sorption Analyzer. NaCl and PVP were used as calibration standards. Samples were not dried prior to analysis. Sorption and desorption data were collected over a range from 5% to 95% RH at 10% RH increments under a nitrogen purge. The equilibrium criterion used for analysis was less than 0.0100% weight change in 5 minutes with a maximum equilibration time of 3 hours. Data were not corrected for the initial moisture content of the samples.

The invention claimed is:

1. A crystalline salt of R-ketorolac and meglumine, having an x-ray powder diffraction pattern comprising one or more peaks at about 4.0°2θ, about 8.1°2θ, about 11.8°2θ, about 14.9°2θ, about 18.6°2θ, about 19.1°2θ, about 20.6°2θ, and about 23.2°2θ.

2. The crystalline salt of claim 1, having an x-ray powder diffraction pattern comprising a peak at about 4.0°2θ.

3. The crystalline salt of claim 1, having an x-ray powder diffraction pattern comprising a peak at about 8.1°2θ.

4. The crystalline salt of claim 1, having an x-ray powder diffraction pattern comprising a peak at about 11.8°2θ.

5. The crystalline salt of claim 1, having an x-ray powder diffraction pattern comprising a peak at about 14.9°2θ.

6. The crystalline salt of claim 2, having an x-ray powder diffraction pattern further comprising a peak at about 18.6°2θ.

7. The crystalline salt of claim 2, having an x-ray powder diffraction pattern further comprising a peak at about 19.1°2θ.

8. The crystalline salt of claim 2, having an x-ray powder diffraction pattern further comprising a peak at about 20.6°2θ.

9. The crystalline salt of claim 2, having an x-ray powder diffraction pattern further comprising a peak at about 23.2°2θ.

10. The crystalline salt of claim 1 having a DSC thermogram comprising a DSC endothermic peak at about 140° C.

11. The crystalline salt of claim 1 having an x-ray powder diffraction pattern substantially the same as FIG. 6.

12. The crystalline salt of claim 1 having substantially the same DSC thermogram as FIG. 8.

13. A pharmaceutical composition comprising the crystalline salt of claim 1 and a pharmaceutically acceptable excipient.

14. A method of treating cancer comprising administering to a patient in need thereof an effective amount of the crystalline salt of claim 1.

* * * * *